US010097537B2

(12) United States Patent
Zaifman et al.

(10) Patent No.: US 10,097,537 B2
(45) Date of Patent: Oct. 9, 2018

(54) CLOUD-BASED AUTHENTICATION KEYBOARD

(71) Applicant: AT&T INTELLECTUAL PROPERTY I, LP, Atlanta, GA (US)

(72) Inventors: Arthur L. Zaifman, Millburn, NJ (US); Adam Edgar, Ironia, NJ (US); John M. Mocenigo, Califon, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 175 days.

(21) Appl. No.: 15/092,930

(22) Filed: Apr. 7, 2016

(65) Prior Publication Data

US 2017/0295160 A1 Oct. 12, 2017

(51) Int. Cl.
*H04L 29/00* (2006.01)
*H04L 29/06* (2006.01)

(52) U.S. Cl.
CPC .................. *H04L 63/083* (2013.01)

(58) Field of Classification Search
CPC .................................... H04L 63/083
See application file for complete search history.

(56) References Cited

U.S. PATENT DOCUMENTS

| 6,230,272 | B1 | 5/2001 | Lockhart et al. |
| 6,480,587 | B1 | 11/2002 | Rao et al. |
| 6,970,562 | B2 | 11/2005 | Sandhu et al. |
| 7,512,804 | B2 | 3/2009 | Nunnelley et al. |
| 7,734,923 | B2 | 6/2010 | Richards et al. |
| 8,260,710 | B2 | 9/2012 | Lipsky et al. |
| 8,351,408 | B2 | 1/2013 | Daigle et al. |
| 8,434,027 | B2 | 4/2013 | Jones et al. |
| 8,544,080 | B2 | 9/2013 | Arauz et al. |
| 8,745,409 | B2 | 6/2014 | Teicher et al. |
| 8,769,304 | B2 | 7/2014 | Kirsch |
| 9,032,401 | B2 | 5/2015 | Amano et al. |

(Continued)

FOREIGN PATENT DOCUMENTS

| EP | 0587375 | 3/1994 |
| EP | 1121781 A1 | 8/2001 |

(Continued)

OTHER PUBLICATIONS

"1 Password for Mac," Agile Bits, agilebits.com, Oct. 29, 2015. http://web.archive.org/web/20151029234814/https://agilebits.com/onepassword/mac.

(Continued)

*Primary Examiner* — Ghodrat Jamshidi
(74) *Attorney, Agent, or Firm* — Guntin & Gust, PLC; David Terrell

(57) ABSTRACT

Aspects of the subject disclosure may include, for example a method that includes detecting, by a system comprising a processor, a password creation request, obtaining, by the system, an identification of a password requesting application associated with the password creation request, receiving, by the system, an input password, obtaining, by the system, a transformation key for the input password, transforming, by the system, the input password into an adjusted password by applying the transformation key to the input password, and providing, by the system, the adjusted password to the password requesting application. Other embodiments are disclosed.

20 Claims, 8 Drawing Sheets

(56) References Cited

U.S. PATENT DOCUMENTS

| | | | |
|---|---|---|---|
| 9,049,023 B2 | 6/2015 | Green | |
| 9,146,622 B2 | 9/2015 | Cresp et al. | |
| 9,148,420 B2 | 9/2015 | Ferchichi et al. | |
| 9,166,970 B1 | 10/2015 | Dundas et al. | |
| 9,171,147 B2 | 10/2015 | Logan et al. | |
| 9,189,084 B2 | 11/2015 | Hicks et al. | |
| 9,235,732 B2 | 1/2016 | Eynon et al. | |
| 2001/0034690 A1* | 10/2001 | Joseph | G06Q 30/06 705/37 |
| 2003/0191964 A1* | 10/2003 | Satyavolu | H04L 63/0815 726/5 |
| 2008/0031447 A1* | 2/2008 | Geshwind | H04L 9/0822 380/46 |
| 2010/0017616 A1* | 1/2010 | Nichols | G06F 21/41 713/183 |
| 2010/0275257 A1 | 10/2010 | Nishida et al. | |
| 2013/0167209 A1* | 6/2013 | McBride | G06F 21/41 726/6 |
| 2014/0181529 A1 | 6/2014 | Joyce et al. | |
| 2014/0365778 A1 | 12/2014 | Wang | |
| 2016/0366134 A1* | 12/2016 | Hughes | H04M 15/00 |
| 2017/0257215 A1* | 9/2017 | Huang | H04L 9/30 |

FOREIGN PATENT DOCUMENTS

| | | |
|---|---|---|
| WO | 2008122201 A1 | 10/2008 |
| WO | 2015169107 | 11/2015 |

OTHER PUBLICATIONS

"How It Works," LastPass, lastpass.com. accessed: Feb. 7, 2016. https://lastpass.com/how-it-works/.

"Password Keyboard," Pilcrow, pilcrow.ch, Feb. 8, 2016. https://web.archive.org/web/20160208043929/http://www.pilcrow.ch/product/passwordkeyboard/.

Ghogomu, Mbiyimoh, "The Self-Powered Liquid-Proof Keyboard That Recognizes You by Your Unique Typing Style," The Higher Learning, thehigherlearning.com. Jan. 25, 2015.

Penaflorida, Rexly, "Intelligent Keyboard Secures Biometric Password, Charges Portable Devices With Human Electricity," Tom's Hard Ware, tomshardware.com. Jan. 26, 2015.

\* cited by examiner

100

200

300

400

CLOUD-BASED AUTHENTICATION KEYBOARD

FIELD OF THE DISCLOSURE

The subject disclosure relates to a system for presenting secure passwords.

BACKGROUND

Various websites and applications require passwords. Some passwords can be difficult to remember and subject to discovery if written down or stored remotely.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of password management such as via providing a secure password to a password requesting application. Other embodiments are described in the subject disclosure.

One or more aspects of the subject disclosure include a method that includes detecting, by a system comprising a processor, a password creation request, obtaining, by the system, an identification of a password requesting application associated with the password creation request, receiving, by the system, an input password, obtaining, by the system, a transformation key for the input password, transforming, by the system, the input password into an adjusted password by applying the transformation key to the input password, and providing, by the system, the adjusted password to the password requesting application.

One or more aspects of the subject disclosure include an apparatus which could include at least one processor and a memory that stores executable instructions that, when executed by the at least one processor, facilitate performance of operations, including receiving a password request from an application, retrieving a stored transformation key for the application, obtaining a simple password for the application, applying the stored transformation key to the simple password to generate an adjusted password for the application, and transmitting the adjusted password to the application.

One or more aspects of the subject disclosure include a machine-readable storage medium, comprising executable instructions that, when executed by a processor, facilitate performance of operations, including receiving a password request from an application, retrieving a stored transformation key for the application, obtaining a simple password for the application, applying the stored transformation key to the simple password to generate an adjusted password for the application, and transmitting the adjusted password to the application.

Figure 1:
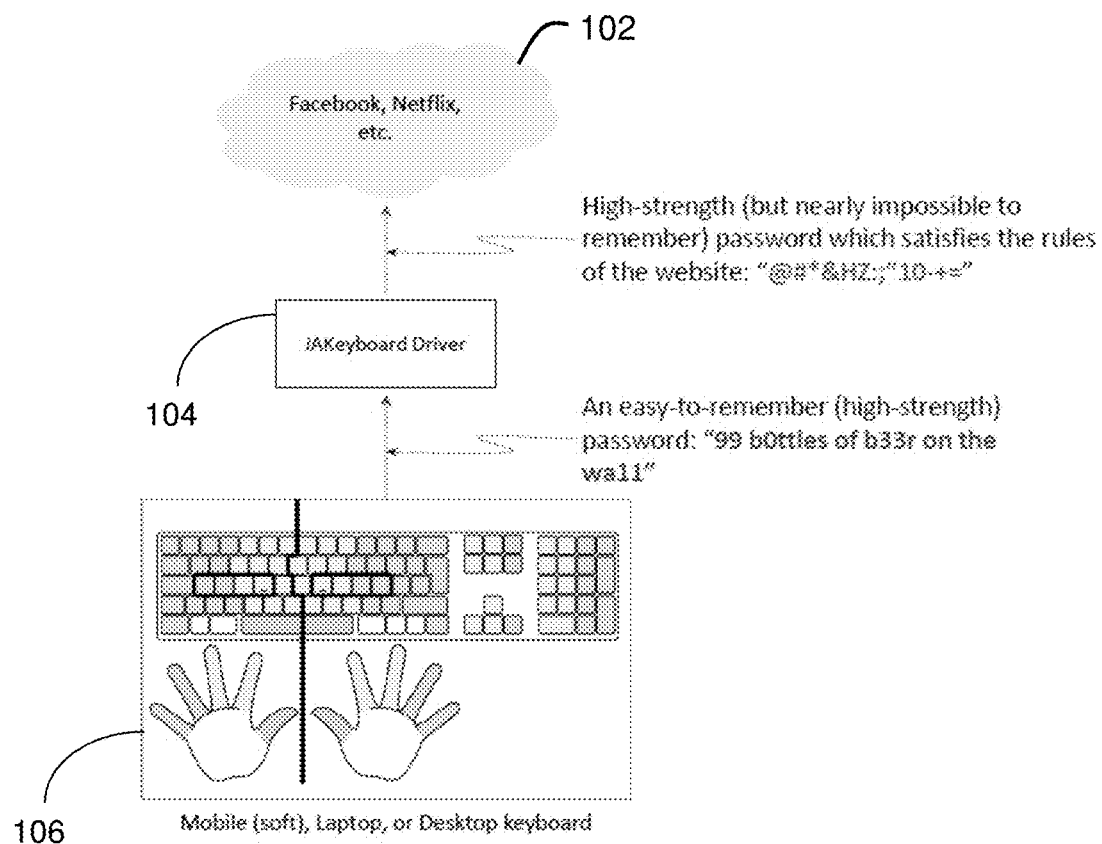
FIG. 1 depicts an illustrative embodiment of system 100 that enables password management.

FIG. 1 depicts an illustrative embodiment of system 100. Exemplarily, in system 100, a computing device 106 can interact with equipment (e.g., a server) of a password requiring entity 102. In system 100, a keyboard driver 104 can exemplarily adapt an easy to remember password that a user simply memorizes into a high-strength password that cannot be easily guessed or otherwise arrived at. At the computing device 106, a keyboard application or other computing applications can exemplarily store a transformation key that will allow the easy to remember password to be transformed into the high-strength password for the password requiring entity 102.

Exemplarily, the password requiring entity 102 can be any website, application, or software that would require a password. Exemplarily, the computing device 106 can be any computing or communications device capable of accessing a password requiring entity 102. Exemplarily, the keyboard driver 104 can be an embodiment of the present application that can store the transformation key for the computing device 106. Exemplarily, the computing device 106 and keyboard driver 104 can be combined (e.g., the driver operating on a processor of the computing device) or separate (e.g., the driver operating on a processor that is separate from the computing device).

Figure 2:
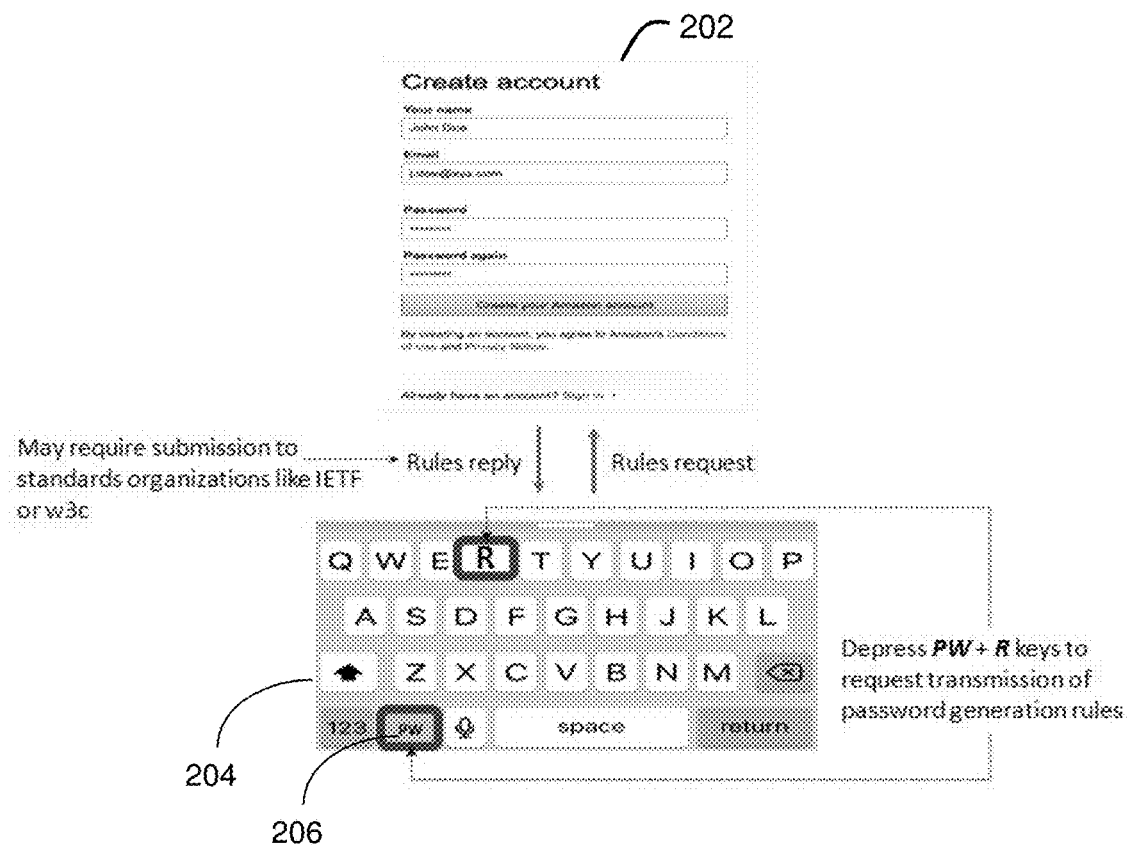
FIG. 2 depicts an illustrative embodiment of system 200 that enables password management.

FIG. 2 depicts an illustrative embodiment of system 200. In system 200, a password requesting website 202 may include password rules. The password rules may be requirements for the password requesting website 202 for the password to possess in order for the password to be accepted for an account of the user creating the password. Exemplarily, a computing device can have an application which includes an interface 204 to interact with the password requesting website 202. In some embodiments the interface 204 can include a password button 206 in a virtual keyboard, for example, that can activate embodiments of the password creation device.

Exemplarily, the password rules of password requesting website 202 can be determined by an optical scan of the web-site page. In other embodiments, the password rules of password requesting website 202 can be determined by examining the URL of the webpage itself. In other exemplary embodiments, the password rules of password requesting website 202 can be determined via a protocol exchange that takes place between the application, the interface 204, and the password requesting website 202. In yet other embodiments, the application or interface 204 can conduct a trial and error approach to learning the password requirements of the password requesting website 202.

Figure 3:
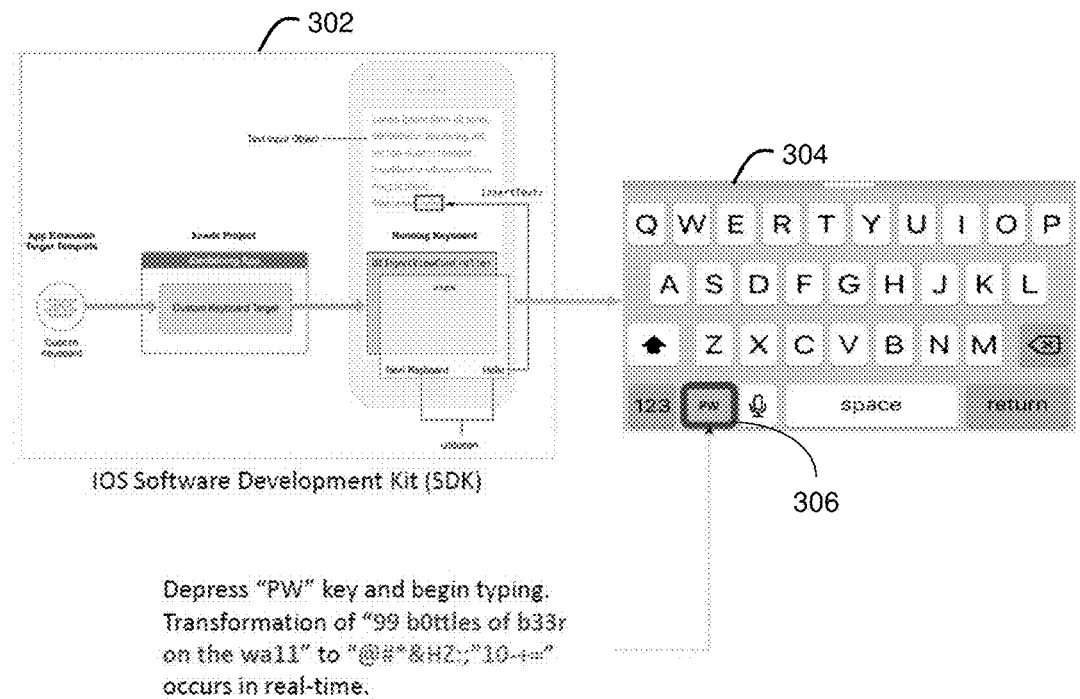
FIG. 3 depicts an illustrative embodiment of system 300 that enables password management.

FIG. 3 depicts an illustrative embodiment of system 300. In system 300, an IOS software development Kit 302 can be provided to create various exemplary interfaces 304 for embodiments of the present invention. In some embodiments of the invention, the interface 304 can include an initiate password "PW" key 306 to start the recording of the simple password which will be used to create the eventual high-strength password that will be provided to a password requesting entity, such as the password requesting website 202 of FIG. 2.

In some embodiments, a virtual keyboard can be created to include the initiate password "PW" key 306 while in other embodiments, the application can appear on-screen. In yet other embodiments, a real-world keyboard can be used while the computing device assigns designated key-strokes to activate the password application, such as CTRL+F11.

Furthermore, in the embodiments of systems 100, 200, and 300, the use of the initiate password "PW" key 306 will initiate the creation of a transformation key for an application or website while in other embodiments, the activation of the initiate password "PW" key 306 will simply start the interface 304 to being recording the simple password before exemplarily providing a high-strength password to the application or website.

In particular, each website or application that requires a password can exemplarily have assigned to it a unique password generator or transformation key. Thus, in one embodiment, if the application creates or attempts to access ten websites, the application would create a unique password for each website, resulting in ten unique transformation keys. Each transformation key would be assigned to a respective website. Exemplarily, even if the user were to use the same simple password for each website, each website would ultimately have a different password generated for it. As the password would be only stored at the respective website, the interface 304 would only store the transformation keys.

As a result, even if an unwanted party were to gain access to the interface 304, there would be no indication or ability to generate the correct passwords. Furthermore, an outside intruder would be presented with a great challenge as each website log on for the user is of an unmemorizable or guessable strength password. As illustrated, for example in FIG. 3, an easy to remember password of "99 b0ttles of b33r on the wa11" would be converted to "@#*&HZ;:"10-+=" in real time by the application and presented to the website. Even if the user used "99 b0ttles of b33r on the wa11" for each website, each website would have a different password. Accordingly, password security would be greatly strengthened while not requiring undue efforts to remember or conceal high-strength passwords by the user. That is, the user won't resort to cheats such as writing down the password to be found by unwanted intruders.

In additional embodiments, alternative passwords could be transformed via the transformation key. For example, a vocal or visual password could be transformed into a new password. Thus, the vocal password would be exemplarily scrambled. Similarly, a visual password, such as a facial identification, would be scrambled by the transformation key. Additionally, some embodiments could use biometrics to create the transformation key or to be scrambled by the transformation key.

Figure 4:
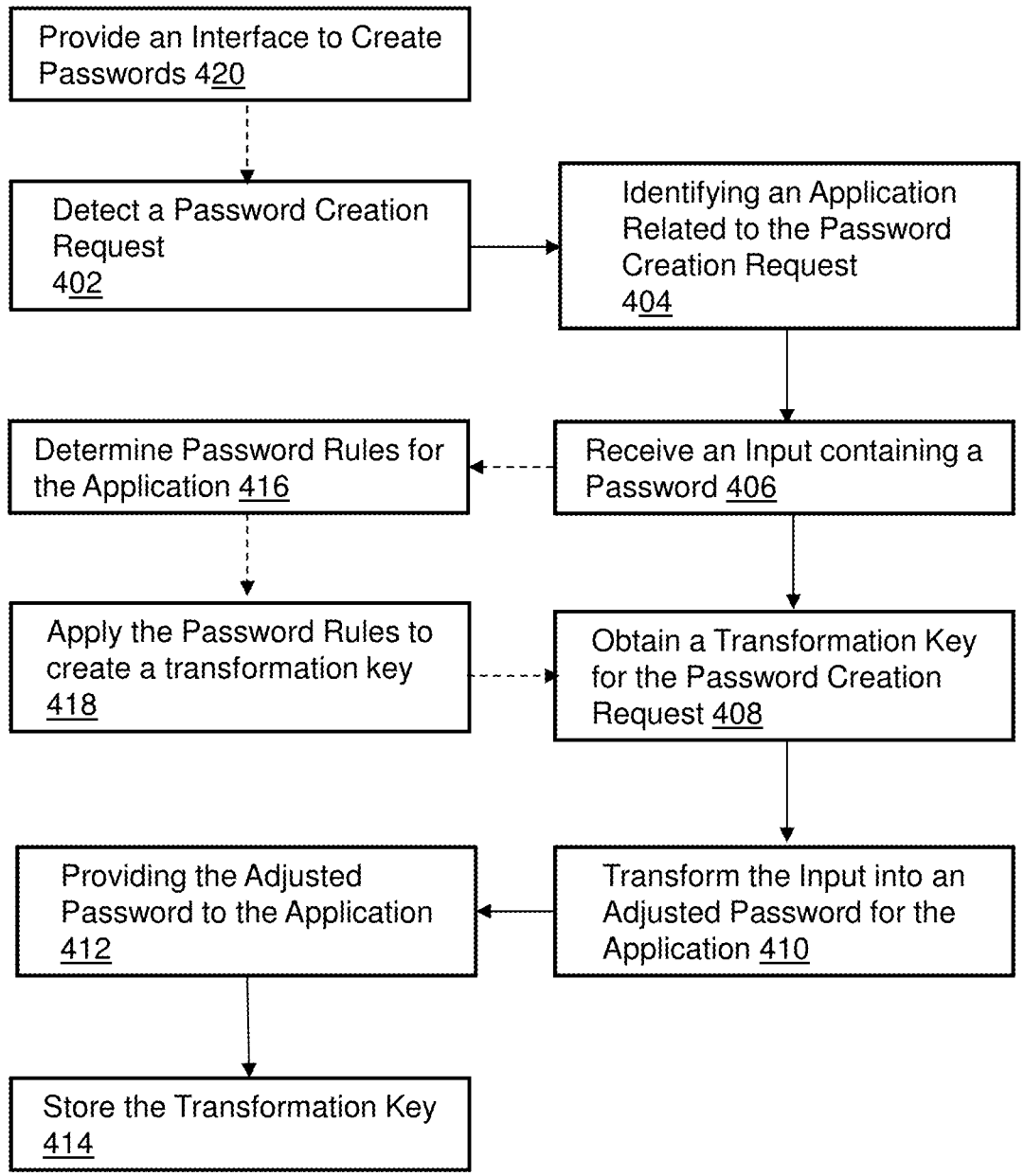
FIG. 4 depicts an illustrative embodiment of a method used in portions of the systems described in FIGS. 1-3.

FIG. 4 depicts an illustrative embodiment of a method 400 used by keyboard driver 104, for example. Exemplarily, method 400 would begin at Step 402 in which a password creation attempt is detected. In alternative embodiments, an interface to create or enter the password can be provided in Step 420. The interface can be a virtual keyboard with an activation key such as initiate password "PW" key 306 of the interface 304 as illustrated in FIG. 3. In some embodiments, the Password Creation Request can be detected at the command of the user, such as by pressing initiate password "PW" key 306. In other embodiments, the Password Creation Request can be detected from the requesting application. For example, embodiments of the password application can detect a password request on a display associated with the application, such as in a web browser or through an application. In other embodiments, the requesting application or browser can prompt the application to start the password process.

In Step 404, an entity, such as an application or website, that requests the password is detected and identified. Thus, if a first website is accessed, that first website is identified. Accordingly, the first website can be differentiated from additional websites and their passwords and transformation keys. Next, in Step 406, a user can input his simple password for the website. Thus, as illustrated in FIG. 3, the user can enter "99 b0ttles of b33r on the wa11".

In Step 408, a transformation key for the website is generated. Exemplarily, the transformation key can only be used for the first website and additional applications or websites requesting passwords to be created will receive their own transformation key as well. In some embodiments, Step 408 can take place before Step 406. That is, each website or password requesting entity would have its own unique transformation key or password generator.

In alternative embodiments, the application can, in Step 416, determine the password rules for the password requesting entity. Exemplarily, the password rules of password requesting entity could be determined by an optical scan of its web-site password creation page. In other embodiments, the password rules of password requesting entity can be determined by examining the URL of the webpage itself. In other exemplary embodiments, the password rules of password requesting entity can be determined via a protocol exchange that takes place between the application and the password requesting entity. In yet other embodiments, the application can conduct a trial and error approach to learning the password requirements of the password requesting entity. Thus, if the password requesting entity were to ultimately reject a submitted high-strength password, the application could determine if certain characteristics of the generated high-strength password were unsuitable. In another example, the application could determine if the submitted passwords were too long or too short.

Next, in alternative Step 418, the password rules that were determined in Step 416 can be applied so as to shape the generation of the transformation key of the website. Thus, in some embodiments, if the password requesting entity required use of capital letters and no numbers, the transformation key would be so encoded so as to not produce forbidden number while ensuring the creation of the required capital letters. In other embodiments, the transformation key could be generated so as to not use proper nouns or other easily guessable passwords. Thus, Step 308 could be informed by the rules detected in Step 416 and applied thereto in Step 418.

In Step 410, the transformation key is applied to the simple password so as to create an adjusted password. Exemplarily, the adjusted password is a high-strength password for the password requesting entity or website. Thus, as illustrated in FIG. 3, the user's regular, easy to remember password of "99 b0ttles of b33r on the wa11" is transformed by the application using the transformation key into "@#*&HZ;:"10-+=". As discussed above, the password requesting entity would have a first transformation key that produced this high-strength password when the user's password is entered while other websites would have their own unique transformation keys that would result in other high-strength passwords being generated, even if the same simple to remember password were entered.

In Step 412, the adjusted password, which is exemplarily a high strength password, is submitted to the password requesting entity as the new password for that entity. The adjusted password would be stored at the password requesting entity as normally done. The adjusted password would exemplarily not be provided to the user or made known. In addition, the adjusted password would exemplarily not be stored at any point on the user's side of the process (e.g., not stored on user equipment). Instead, as discussed above, only the transformation key would be stored, as illustrated in Step 414.

Figure 5:
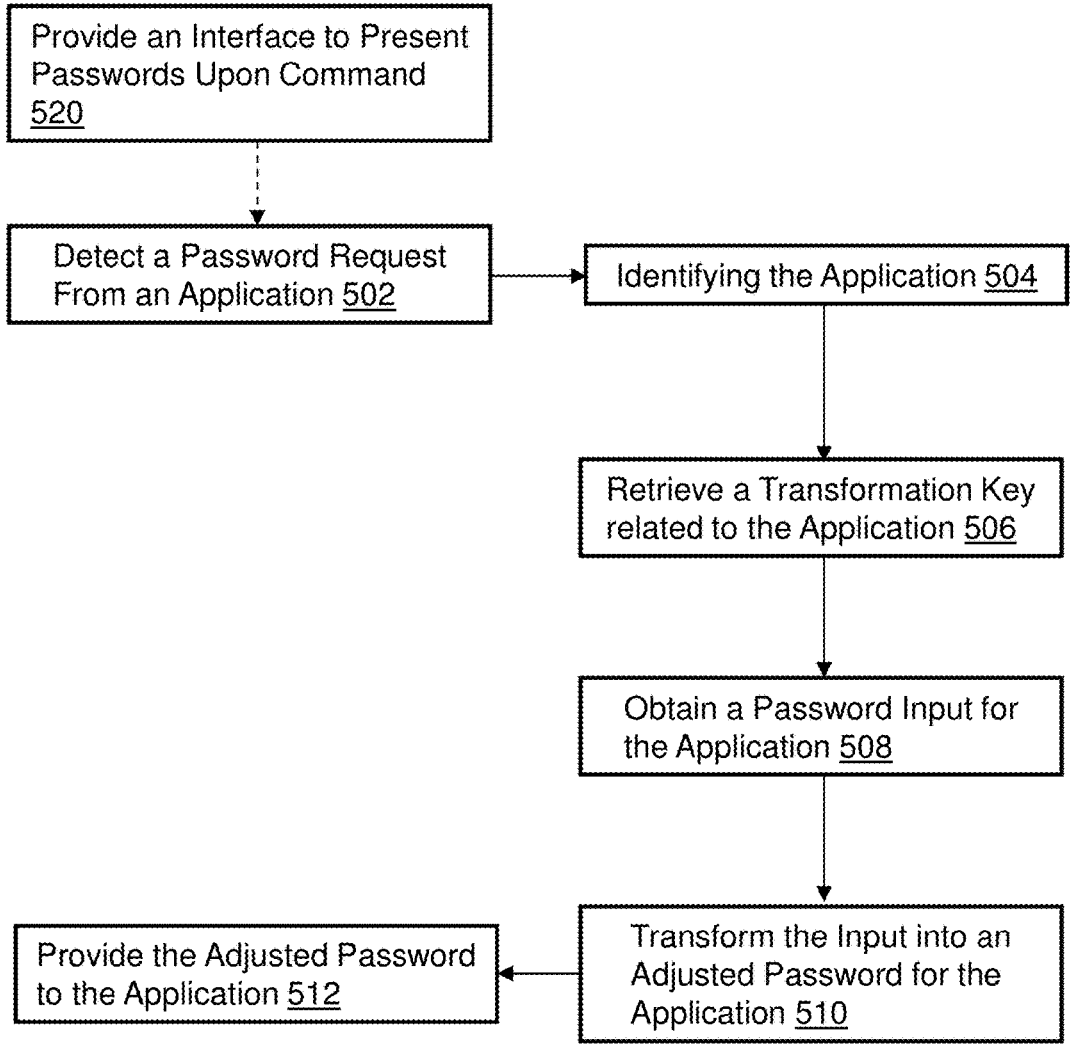
FIG. 5 depicts an illustrative embodiment of a method used in portions of the system described in FIGS. 1-3.

FIG. 5 depicts an illustrative embodiment of a method 500 used by the embodiments of systems 100, 200, and 300 as exemplarily illustrated in FIGS. 1-3. In particular, method 500 is an exemplary process by which the application can access the password requesting entity. In particular, a user can access a password requesting entity that has a high security password by entering in an easy to remember password. Exemplary embodiments of the invention would then translate the easy to remember password into the unique high security password for that password requesting entity.

In Step 502, an exemplary application would detect that a user has attempted to access a password requesting entity. That is, a background running application may detect via a prompt from the password requesting entity or by scanning a screen of a computer that a password is being requested. In alternative embodiments, in Step 520, an interface, such as a graphical user interface, is provided to the user. The user can then use the graphical user interface to summon or otherwise command or request exemplary embodiments of the application to activate. In one example, the password button 206 in a virtual keyboard of FIG. 2 could be activated. The application would then be notified of the request for a password.

Next, in Step 504 the identity of the password requesting entity would exemplarily be performed. For example, the application could simply scan the display to determine the identity of the password requesting entity. In other embodiments, the application could determine the identity of the password requesting entity through its URL. In yet other embodiments, the application could receive a message from the password requesting entity that identifies the password requesting entity to the application. In other embodiments, the application could identify the password requesting entity through trial and error.

One the identity of the password requesting entity is acquired, in Step 506, the transformation key for that password requesting entity would be retrieved. Once the transformation key for the password requesting entity is retrieved, the user would be prompted to enter in the low-strength or easy-to-remember password in Step 508. That is, the user's password would be obtained. The user's password could be obtained via a keyboard entry, a vocal entry, or via a visual identifier.

In Step 510, the obtained user password would be transformed by the transformation key into the high strength password for the password requesting entity. The transformed password would then be provided to the password requesting entity in Step 512.

While for purposes of simplicity of explanation, the respective processes are shown and described as a series of blocks in FIGS. 4 and 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
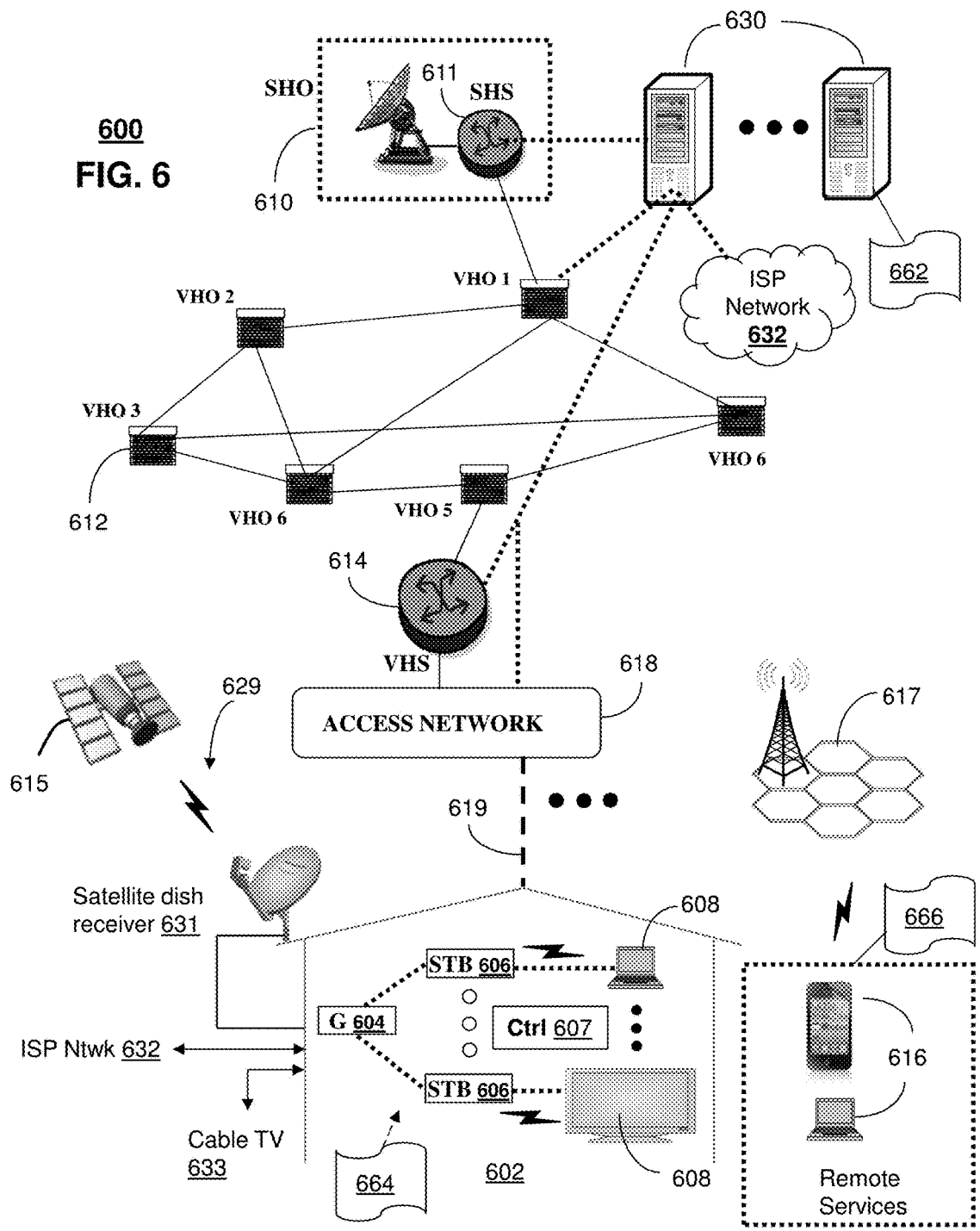
FIG. 6 depict illustrative embodiments of communication systems that provide media services to systems 100, 200, and 300 of FIGS. 1-3.

FIG. 6 depicts an illustrative embodiment of a first communication system 600 for delivering media content. The communication system 600 can represent an Internet Protocol Television (IPTV) media system. Communication system 600 can be overlaid or operably coupled with systems 100, 200, and 300 of FIGS. 1-3 as another representative embodiment of communication system 600. For instance, one or more devices illustrated in the communication system 600 of FIG. 6 can perform a method that includes detecting, by a system comprising a processor, a password creation request, obtaining, by the system, an identification of a password requesting application associated with the password creation request, receiving, by the system, an input password, obtaining, by the system, a transformation key for the input password, transforming, by the system, the input password into an adjusted password by applying the transformation key to the input password, and providing, by the system, the adjusted password to the password requesting application.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a transformation key provider (herein referred to as transformation key provider 630). The transformation key provider 630 can use computing and communication technology to perform function 662, which can include among other things, obtaining, by the system, a transformation key for the input password described by method 400 of FIG. 4. Alternatively, function 662 of server 630 can be similar to the functions described IOS software development Kit 302 in FIG. 3. The media processors 606 and wireless communication devices 616 can be provisioned with software functions 664 and 444, respectively, to utilize the services of transformation key provider 630. For instance, functions 664 and 444 of media processors 606 and wireless communication devices 616 can be similar to the functions described as obtaining, by the system, a transformation key for the input password described by method 400 of FIG. 4.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
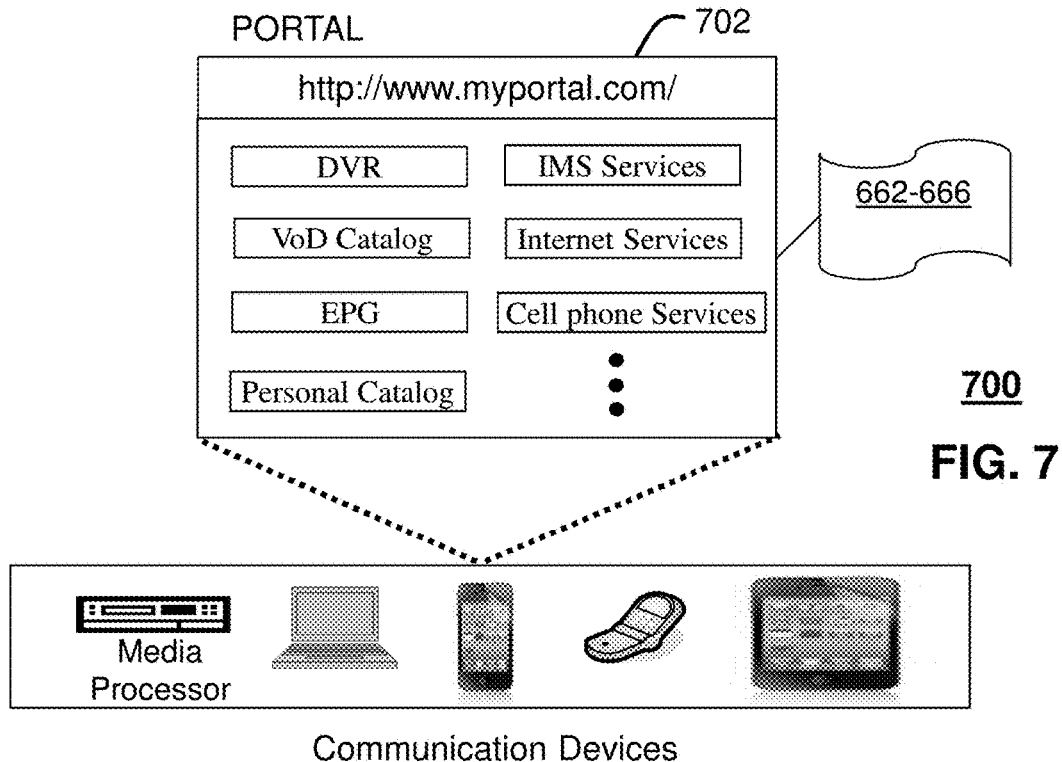
FIG. 7 depicts an illustrative embodiment of a web portal for interacting with the communication systems of systems 100, 200, and 300 of FIGS. 1-3 and to methods 400 and 500 of FIGS. 4 and 5.

FIG. 7 depicts an illustrative embodiment of a web portal 702 of a communication system 700. Communication system 700 can be overlaid or operably coupled with systems 100, 200, and 300 of FIGS. 1-3 and communication system 600 as another representative embodiment of systems 100, 200, and 300 of FIGS. 1-3, communication system 600. The web portal 602 can be used for managing services of systems 100, 200, and 300 of FIGS. 1-3 and communication system 600. A web page of the web portal 602 can be accessed by a Uniform Resource Locator (URL) with an Internet browser using an Internet-capable communication device such as those described in systems 100, 200, and 300 of FIGS. 1-3 and FIG. 6. The web portal 702 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 702 can also be used for provisioning IMS services described earlier, provisioning Internet services, provisioning cellular phone services, and so on.

The web portal 702 can further be utilized to manage and provision software applications 662, 664, and 666 to adapt these applications as may be desired by subscribers and/or service providers of systems 100, 200, and 300 of FIGS. 1-3 and communication system 600. For instance, a user can log into their on-line accounts and provision the servers 110 or server 630 with the transformation key application, IOS software development Kit 302, or an online repository of transformation keys with the identity of their respective password requesting entities and so on. Service providers can log onto an administrator account to provision, monitor and/or maintain the systems 100, 200, and 300 of FIGS. 1-3 or server 630.

Figure 8:
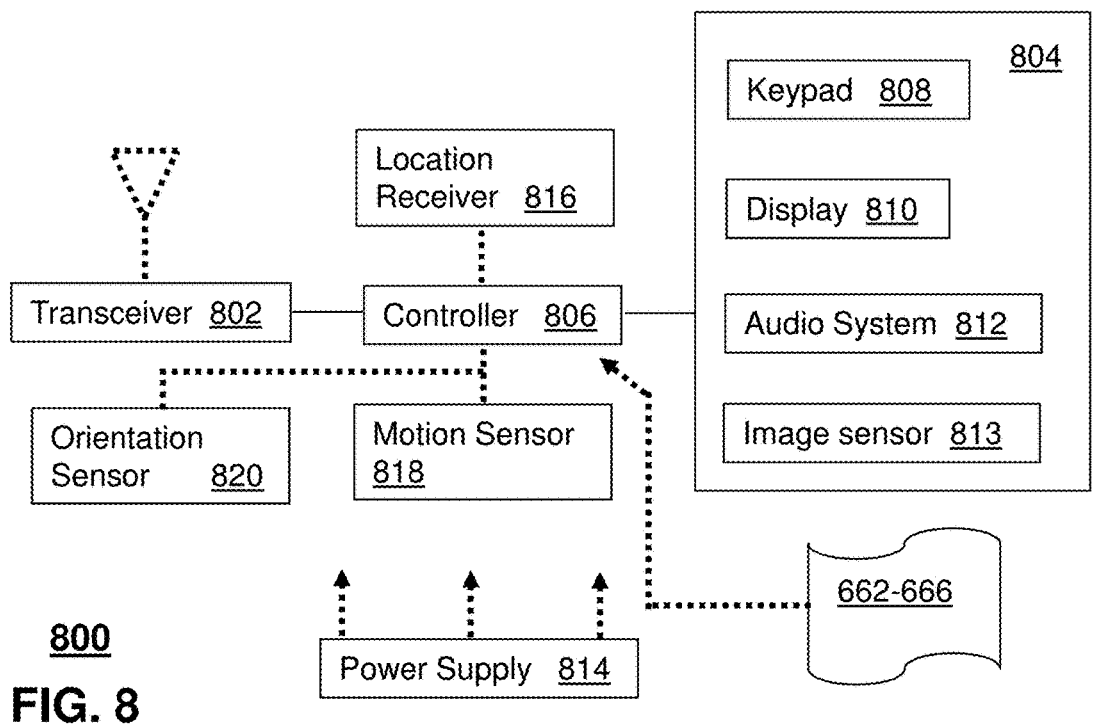
FIG. 8 depicts an illustrative embodiment of a communication device.

FIG. 8 depicts an illustrative embodiment of a communication device 800. Communication device 800 can serve in whole or in part as an illustrative embodiment of the devices depicted in systems 100, 200, and 300 of FIGS. 1-3 and communications system 600 of FIG. 6 and can be configured to perform portions of methods 400 and 500 of FIGS. 4 and 5.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of systems 100, 200, and 300 of FIGS. 1-3, the media processor 606, the media devices 608, or the portable communication devices 616 of FIG. 6. It will be appreciated that the communication device 700 can also represent other devices that can operate in systems 100, 200, and 300 of FIGS. 1-3, communication system 400 of FIG. 4 such as a gaming console and a media player. In addition, the controller 706 can be adapted in various embodiments to perform the functions 662, 664, and 666, respectively.

Upon reviewing the aforementioned embodiments, it would be evident to an artisan with ordinary skill in the art that said embodiments can be modified, reduced, or enhanced without departing from the scope of the claims described below. For example, more advanced password options, such as voice and/or visual passwords can be transformed into unique high strength passwords.

In one embodiment, a user can select a per-website transformation key. In another embodiment, the selected key provides for the same transformation being applied to an easy-to-remember password. In one embodiment, the easy to remember password is selected of a particular length of characters based on a probability of disabling the keyboard (based on failed attempts) prior to a hacker being able to guess the password. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
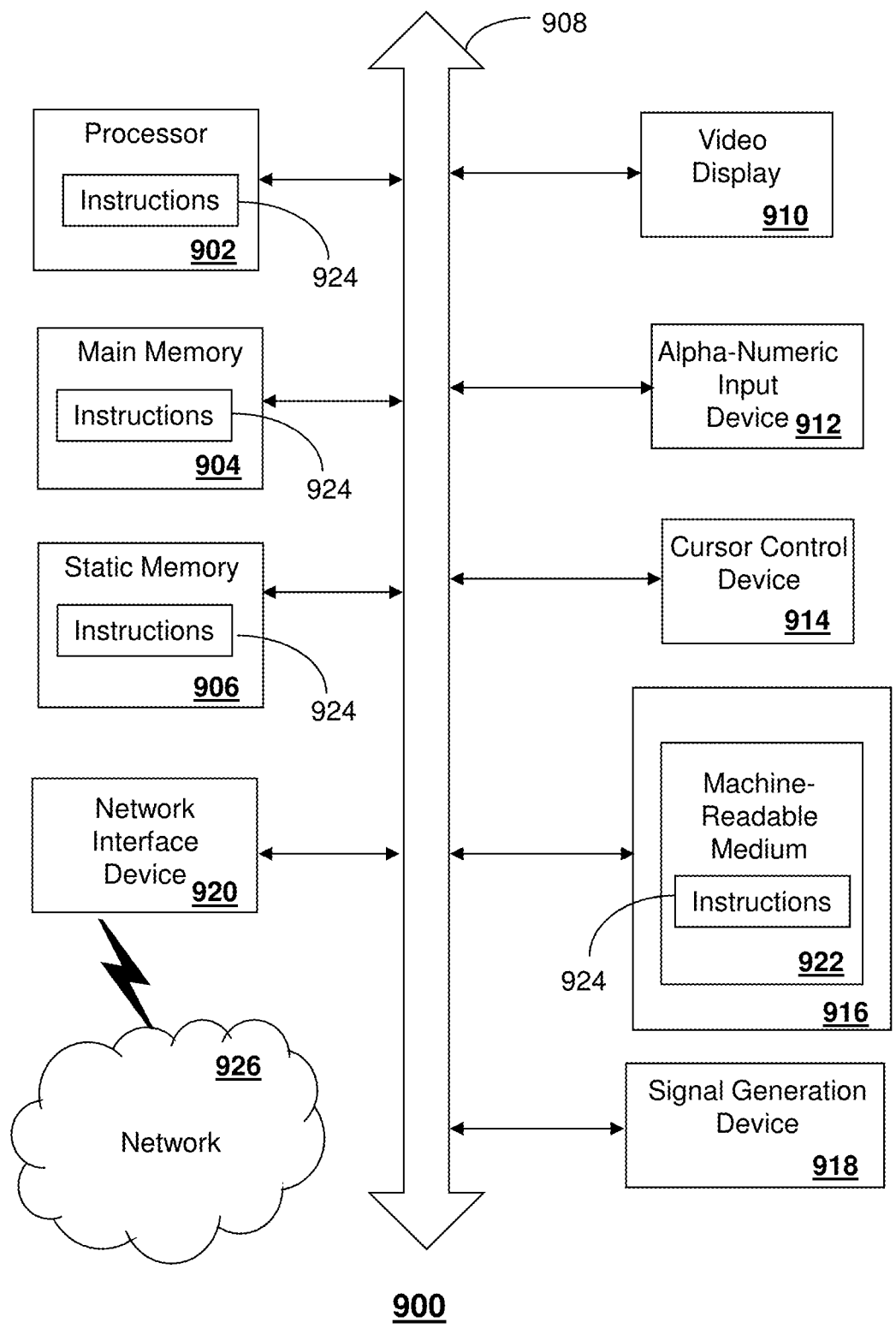
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the transformation key provider 430, the media processor 406, or to perform the exemplary steps in methods 400 and 500 of FIGS. 4 and 5. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    detecting, by a system comprising a processor, a password creation request;
    determining, by the system, rules for the password creation request;
    obtaining, by the system, an identification of a password requesting application associated with the password creation request;
    receiving, by the system, an input password;
    obtaining, by the system, a transformation key for the input password by applying the rules to the transformation key to create the transformation key;
    transforming, by the system, the input password into an adjusted password by applying the transformation key to the input password; and
    providing, by the system, the adjusted password to the password requesting application.

2. The method of claim 1, wherein the rules for the password creation request are determined based on a detecting of displayed rules on a webpage requesting the password.

3. The method of claim 1, wherein the rules for the password creation request are determined based on a detecting of rules from an URL of a webpage requesting the password.

4. The method of claim 1, wherein the rules for the password creation request are determined based on an exchange of protocols with the password requesting application.

5. The method of claim 1, further comprising receiving a password indicator command.

6. The method of claim 5, further comprising providing an interface to present the password indicator command.

7. The method of claim 5, further comprising:
    retrieving a stored transformation key for an application presenting the password indicator command;
    obtaining a simple password for the application presenting the password indicator command;
    applying the stored transformation key to the simple password to generate the adjusted password for the application presenting the password indicator command; and
    transmitting the adjusted password to the application presenting the password indicator command.

8. The method of claim 1, wherein the adjusted password is a high-strength password compared to the password input.

9. The method of claim 1, further comprising:
associating the transformation key with the password requesting application as an associated password requesting application; and
storing the transformation key and the associated password requesting application.

10. The method of claim 1, wherein the transformation key is obtained based at least in part on the identification of a password requesting application associated with the password creation request.

11. The method of claim 1, wherein the adjusted password is unique to the password requesting application.

12. The method of claim 1, wherein the transformation key includes biometric information.

13. An apparatus, comprising:
at least one processor; and
a memory that stores executable instructions that, when executed by the at least one processor, facilitate performance of operations, comprising:
receiving a password request from an application;
determining rules for the password request;
applying the rules to a transformation key to create a stored transformation key for the application;
retrieving the stored transformation key;
obtaining a simple password for the application;
applying the stored transformation key to the simple password to generate an adjusted password for the application; and
transmitting the adjusted password to the application.

14. The apparatus of claim 13, wherein the adjusted password is a high-strength password compared to the simple password.

15. The apparatus of claim 13, wherein the operations further comprise detecting a password creation request from the application, and
responsive to detecting the password creation request:
obtaining an identification of the application;
obtaining a transformation key for the application;
obtaining an input password from a user;
transforming the input password into an adjusted password by applying the transformation key to the input password; and
providing the adjusted password to the application as a created password.

16. The apparatus of claim 15, wherein the operations further comprise:
obtaining password creation rules of the application for the password creation request; and
applying the password creation rules to the transformation key.

17. A non-transitory, machine-readable storage medium, comprising executable instructions that, when executed by a processor, facilitate performance of operations, comprising:
receiving a password request from an application;
determining rules for the password request;
applying the rules to a transformation key to create a stored transformation key for the application;
retrieving the stored transformation key;
obtaining a simple password for the application;
applying the stored transformation key to the simple password to generate an adjusted password for the application; and
transmitting the adjusted password to the application.

18. The non-transitory, machine-readable storage medium of claim 17, wherein the operations further comprise detecting a password creation request from the application, and
in response to detecting the password creation request:
obtaining an identification of the application;
obtaining a transformation key for the application;
obtaining an input password from a user;
transforming the input password into an adjusted password by applying the transformation key to the input password; and
providing the adjusted password to the application as a created password.

19. The non-transitory, machine-readable storage medium of claim 18, wherein the operations further comprise:
obtaining password creation rules of the application for the password creation request; and
applying the password creation rules to the transformation key.

20. The non-transitory, machine-readable storage medium of claim 17, wherein the transformation key for the application is unique to that application, such that different applications have different transformation keys associated therewith.

* * * * *